(12) United States Patent
Kitahama et al.

(10) Patent No.: US 8,745,719 B2
(45) Date of Patent: Jun. 3, 2014

(54) COMMUNICATION CONTROL APPARATUS, FIREWALL APPARATUS, AND DATA COMMUNICATION METHOD

(75) Inventors: Hideki Kitahama, Yokohama (JP); So Ishida, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 917 days.

(21) Appl. No.: 11/953,474

(22) Filed: Dec. 10, 2007

(65) Prior Publication Data
US 2008/0107068 A1 May 8, 2008

Related U.S. Application Data

(63) Continuation of application No. 10/715,496, filed on Nov. 19, 2003, now abandoned.

(30) Foreign Application Priority Data

Nov. 28, 2002 (JP) ................................. 2002-346271

(51) Int. Cl.
*H04L 29/06* (2006.01)
(52) U.S. Cl.
USPC .......................................................... 726/11
(58) Field of Classification Search
USPC ............................. 726/11; 370/28, 29, 31, 38
See application file for complete search history.

(56) References Cited

U.S. PATENT DOCUMENTS

| 6,466,779 | B1 | 10/2002 | Moles et al. | |
|---|---|---|---|---|
| 7,457,863 | B2* | 11/2008 | Takeyoshi et al. | 709/224 |
| 2001/0028647 | A1* | 10/2001 | Teraoka | 370/389 |
| 2002/0004847 | A1 | 1/2002 | Tanno | |
| 2002/0066036 | A1 | 5/2002 | Makineni et al. | |
| 2002/0069278 | A1 | 6/2002 | Forslow | |
| 2002/0080752 | A1 | 6/2002 | Johansson et al. | |
| 2002/0166068 | A1* | 11/2002 | Kilgore | 713/201 |
| 2003/0097590 | A1* | 5/2003 | Syvanne | 713/201 |
| 2003/0110294 | A1 | 6/2003 | Luo | |
| 2003/0167405 | A1 | 9/2003 | Freund et al. | |
| 2004/0057384 | A1* | 3/2004 | Le et al. | 370/252 |
| 2004/0151135 | A1 | 8/2004 | Kitahama et al. | |

FOREIGN PATENT DOCUMENTS

| EP | 1 317 112 A2 | 6/2003 |
|---|---|---|
| JP | 10-070576 | 3/1998 |
| JP | 2002-290444 | 10/2002 |
| JP | 2003-318958 | 11/2003 |

OTHER PUBLICATIONS

Office Action issued Jun. 10, 2011 in Europe Application No. 08 169 688.2.

(Continued)

*Primary Examiner* — Michael S McNally
(74) *Attorney, Agent, or Firm* — Oblon, Spivak, McClelland, Maier & Neustadt, L.L.P.

(57) ABSTRACT

A communication control system 1 according to the present invention is provided with a home agent apparatus 10, a plurality of firewall devices 20-40, and a mobile station 50. When the mobile station 50 is connected, for example, to the firewall device 20, the firewall device 20 receives identification information and a configuration file of the mobile station 50 from the home agent apparatus 10 and constructs a firewall for the mobile station 50, using the configuration file. When the firewall device 20 receives an IP packet, it selects a firewall suitable for the mobile station 50 being a destination of the packet and determines the propriety of passage thereof according to a filtering condition set in this firewall.

6 Claims, 9 Drawing Sheets

(56) References Cited

OTHER PUBLICATIONS

Office Action issued Jun. 10, 2011 in Europe Application No. 08 169 716.1.

Office Action issued Jun. 10, 2011 in Europe Application No. 08 169 695.7.

Office Action issued Nov. 9, 2010, in European Application No. 07 117 071.6-2413.

* cited by examiner

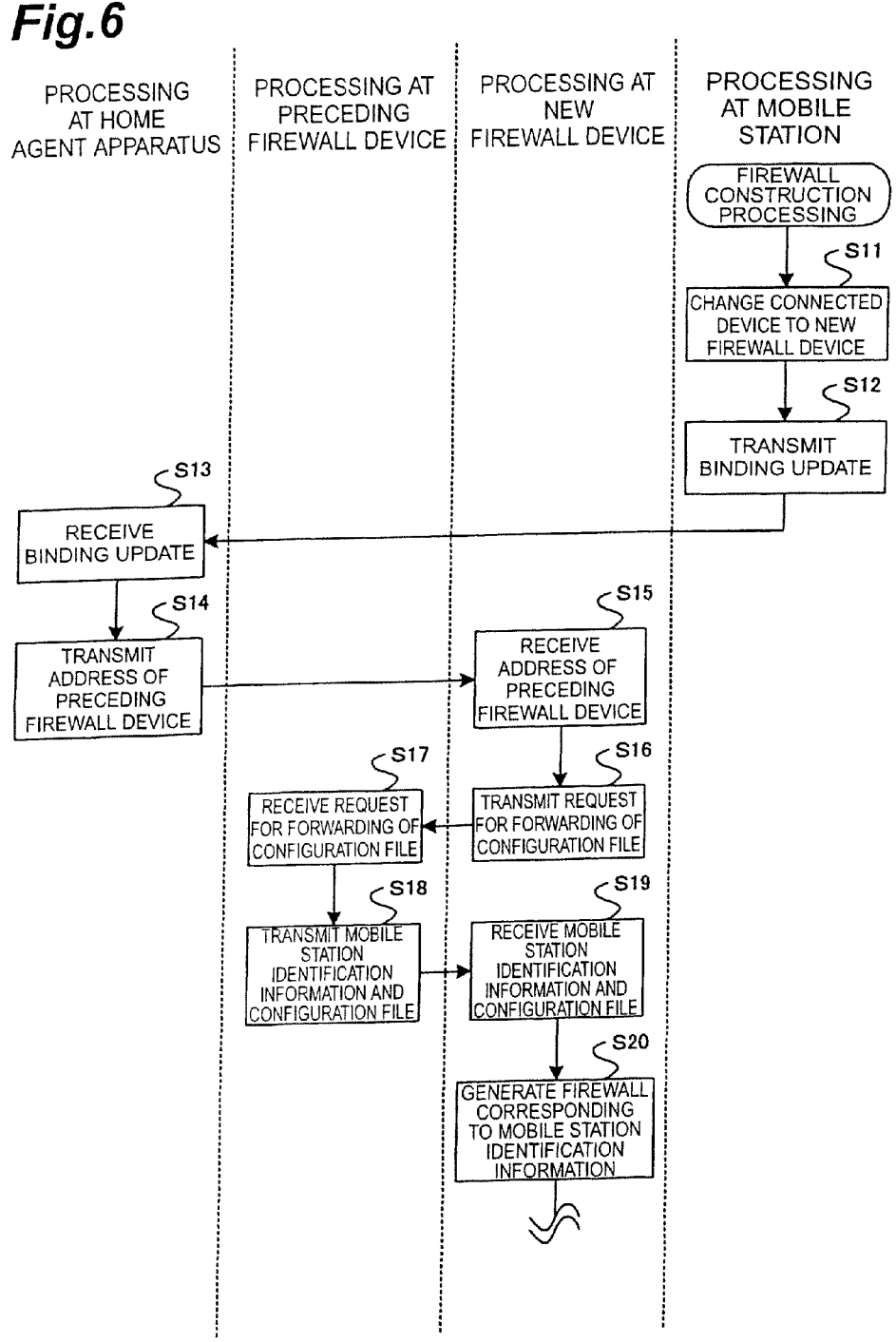

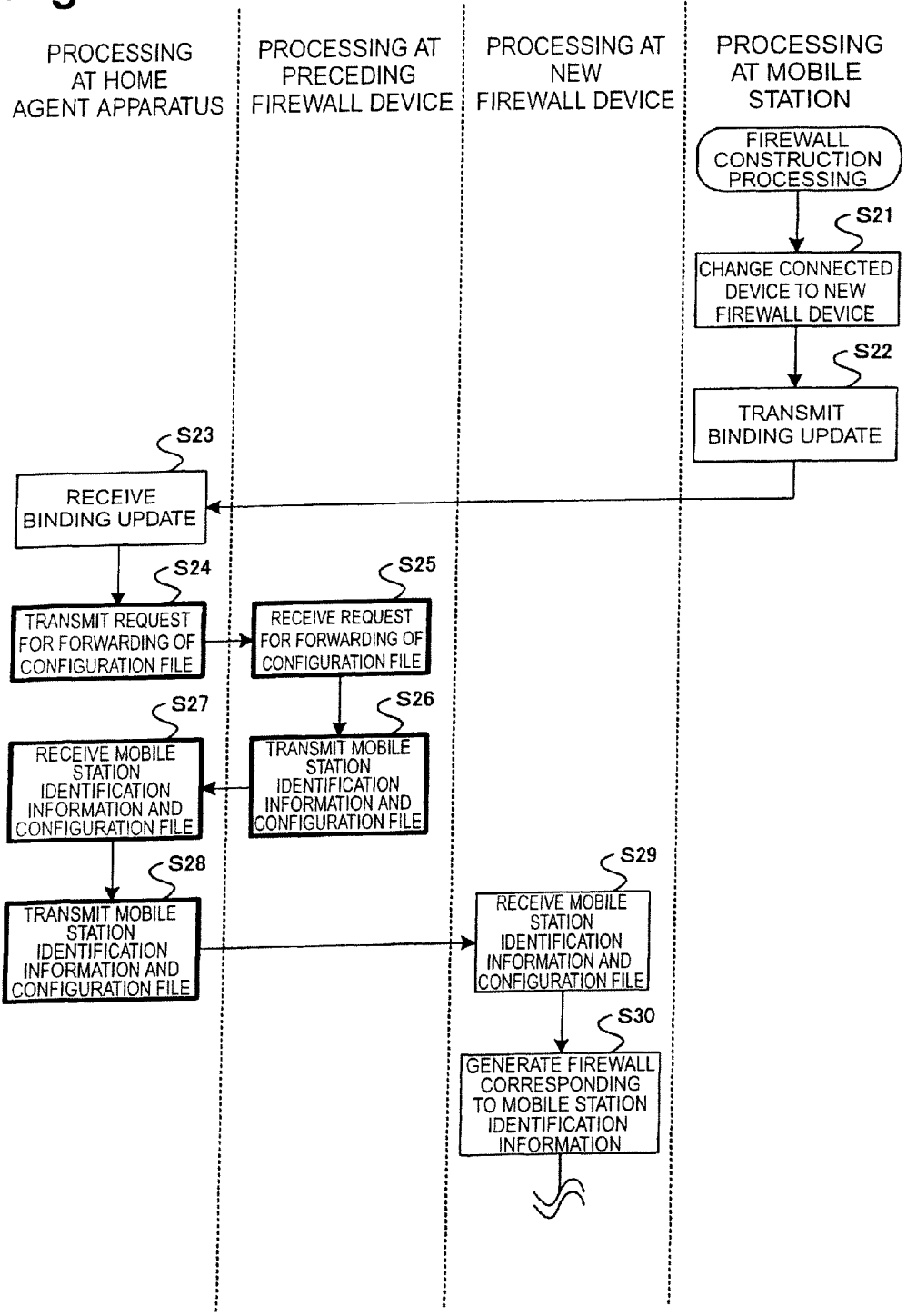

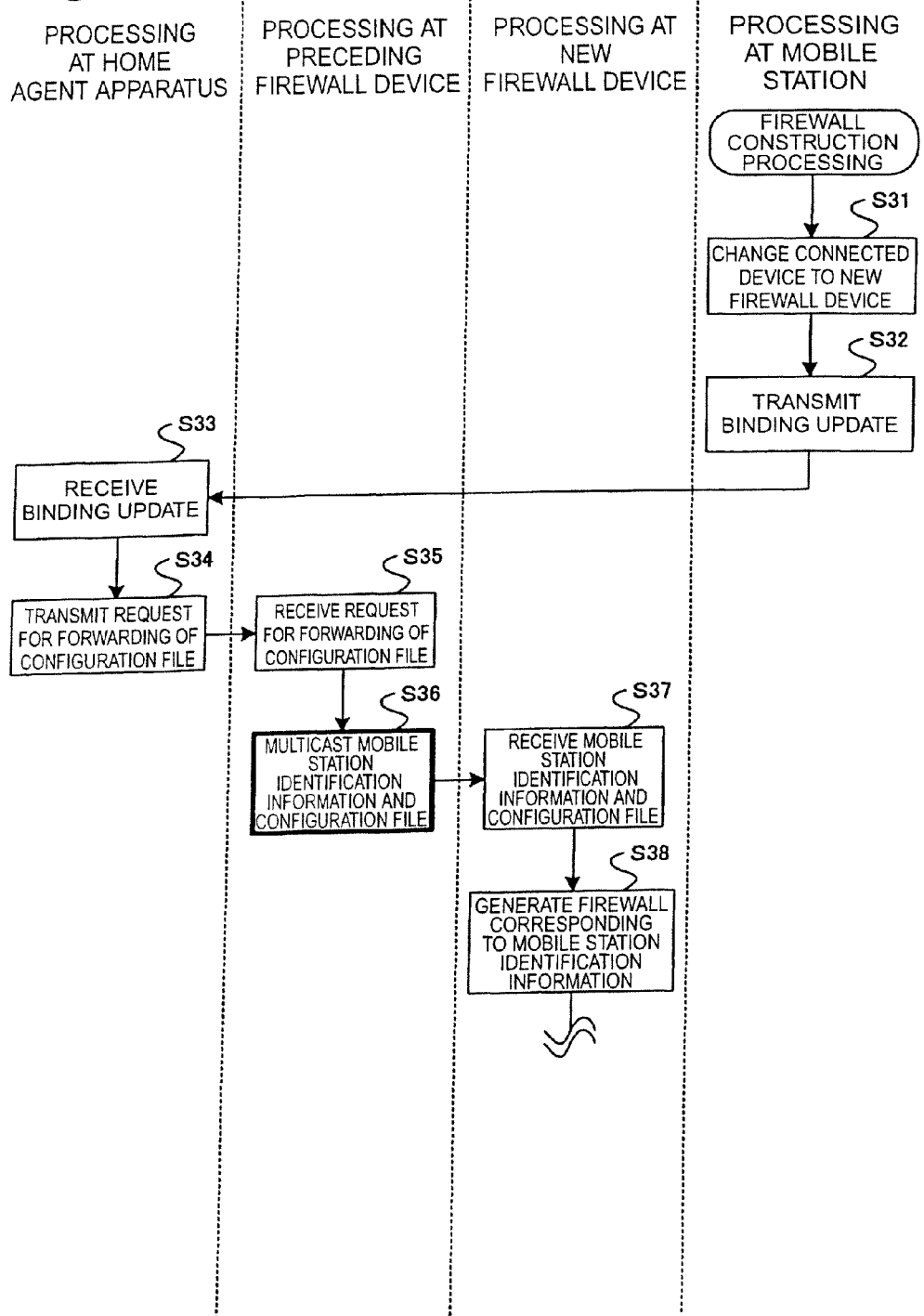

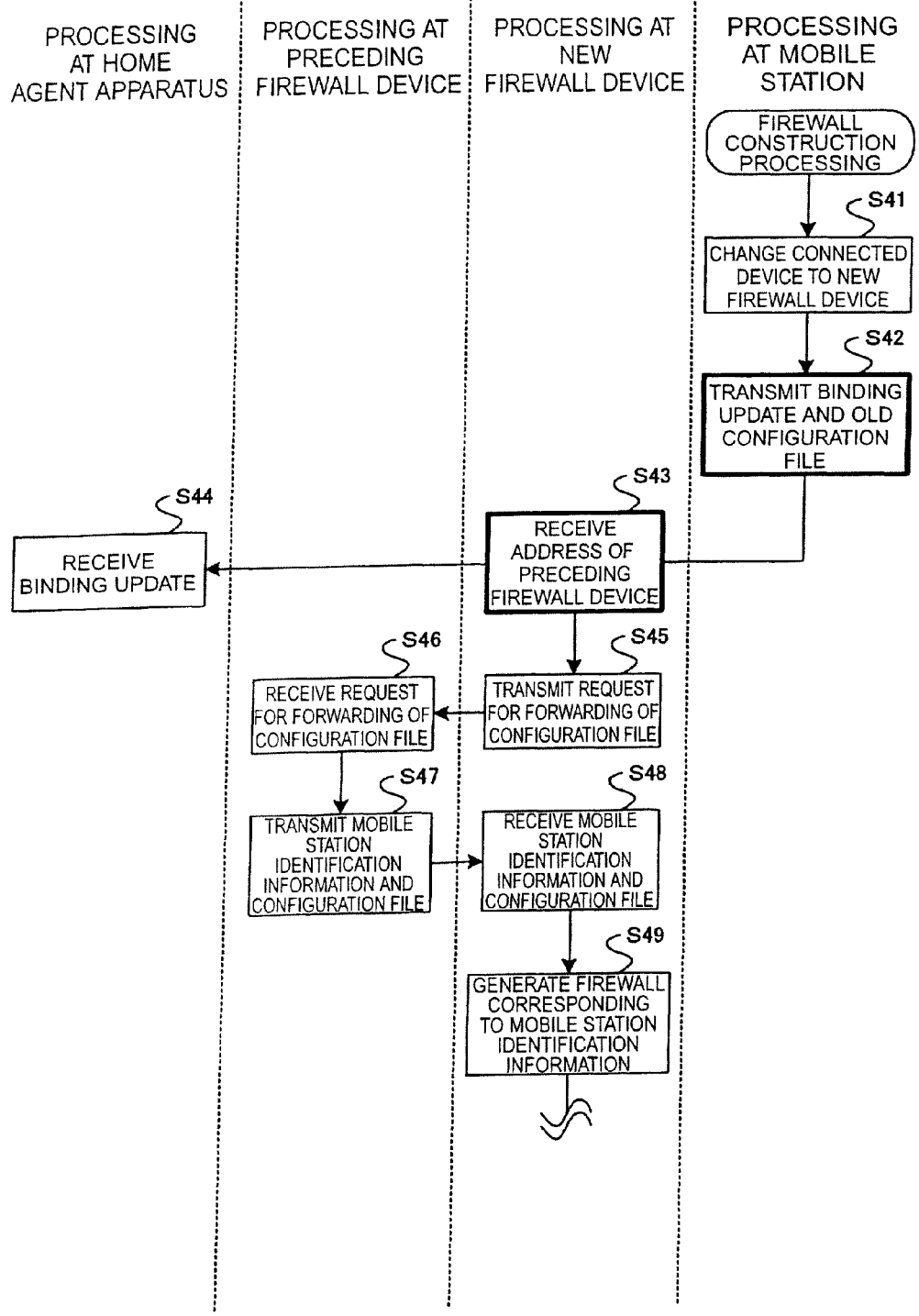

COMMUNICATION CONTROL APPARATUS, FIREWALL APPARATUS, AND DATA COMMUNICATION METHOD

CROSS-REFERENCE TO RELATED APPLICATIONS

This application is a continuation of and claims the benefit of priority from U.S. application Ser. No. 10/715,496, filed Nov. 19, 2003, and from prior Japanese Patent Application No 2002-346271, filed Nov. 28, 2002. The entire contents of the above applications are incorporated herein by reference.

BACKGROUND OF THE INVENTION

1. Field of the Invention

The present invention relates to a communication control apparatus, a firewall apparatus, a communication control system, and a data communication method.

2. Related Background Art

Mobile IPv6, which is the conventional technology of permitting a mobile station such as a cell phone or the like to use the same IP (Internet Protocol) address, regardless of its movement, is under investigation by IETF (Internet Engineering Task Force). Mobile IPv6 is implemented by mobile IP terminals as mobile stations and a home agent. A packet with the destination address being a permanent IP address (home address) of a mobile IP terminal is transmitted according to the normal IP procedure and thereafter arrives at a link of the home agent. This causes the home agent to receive the packet addressed to the home address.

The mobile IP terminal, as moving, is connected to a new node after movement and acquires a care-of (c/o) address being a temporary IP address, using the existing stateless address autoconfiguration (RFC2462) or stateful address autoconfiguration (DHCP: Dynamic Host Configuration Protocol). The mobile IP terminal registers this c/o address with the home agent.

There are two methods for the mobile IP terminal to communicate with another terminal: a bidirectional tunnel mode and a route optimization mode. In the bidirectional tunnel mode, a tunnel is generated between the mobile IP terminal and the home agent. The tunnel is a technique of putting an original IP packet in another IP packet and transmitting it, thereby carrying the packet in an arbitrary route, regardless of the source IP address and destination IP address of the original IP packet, as disclosed in RFC2473.

When the mobile IP terminal transmits an IP packet to another terminal, this IP packet is first transmitted via the tunnel to the home agent. The home agent takes the IP packet out of the tunnel and thereafter sends the IP packet to the other terminal according to the normal IP procedure. This allows the IP packet to reach the other terminal. Conversely, when the other terminal transmits an IP packet to the mobile IP terminal, the IP packet arrives at the home agent according to the normal IP procedure. Thereafter, the home agent puts this IP packet into a tunnel and sends it to the mobile IP terminal.

In contrast to it, in the route optimization mode the mobile IP terminal notifies the other terminal of its IP address, prior to transmission of an IP packet. If the other terminal transmits an IP packet to the mobile IP terminal in the bidirectional tunnel mode, the mobile IP terminal will transmit a c/o address of its own to the other terminal, in order to switch the mode into the route optimization mode.

In the route optimization mode, when the mobile IP terminal transmits an IP packet to another terminal, this IP packet is transmitted directly (without intermediation of a tunnel) from the mobile IP terminal to the other terminal. At this time, the c/o address is set in the source address of the IP packet, and the home address in the home address option in the IP packet.

On the other hand, when the other terminal transmits an IP packet to the mobile IP terminal, the IP packet is provided with a routing header, and the IP packet is transmitted directly (without intermediation of a tunnel) from the other terminal to the mobile IP terminal. The routing header is defined by RFC2460 and is information for transmitting a packet via an arbitrary relay point. The c/o address is set as a first destination (relay point) of the IP packet, and the home address as a second destination.

In the internal networks such as LANs, a firewall, which determines the propriety of passage of data arriving at a boundary between networks, in accordance with a predetermined filtering condition, is located in order to detect and interrupt unauthorized accesses from the external networks such as the Internet. The firewalls are often provided in the software form and used as installed in routers, proxy servers, etc., and in certain cases dedicated hardware devices are also used because of demands for higher performance (e.g., cf. Patent Document 1).

[Patent Document 1] Japanese Patent Application Laid-Open No. 10-70576

SUMMARY OF THE INVENTION

The firewalls have been used heretofore mainly for the purpose of protecting the intra-firm LANs, because they were expensive and hard enough for people other than experts to operate them because of the need for advanced setup technologies, and for the following reasons. Namely, the terminals utilizing dial-up connections and the mobile stations such as the cell phones are connected to the external network at different sites according to circumstances and purposes, and it is thus difficult to specify appropriate and stationary setting locations of the firewalls. Since a terminal utilizing the dial-up connections is assigned different IP addresses upon respective connections, the filtering condition needs to be changed upon every connection, which is not practical. Furthermore, since the dial-up connections are carried out for periods of short connection time, they are at low risk of being exposed to attacks from the Internet during the periods of short connection time. Therefore, the terminals rarely have experienced troubles, even without protection by the firewalls.

Moreover, the terminals used by personal users increasingly have been used in a mode of full-time connection to the external network in recent years, and needs for use of the firewalls also have been increasing for such terminals. However, these terminals, i.e., portable communication terminals such as cell phones, notebook computers, etc. (which will be referred to hereinafter as "mobile stations"), are assumed to change their connected node at high frequency and high speed, and it is thus impossible to apply thereto the firewalls whose installation locations are unchanged.

An object of the present invention is, therefore, to enable application of the firewall function to mobile stations.

In order to solve the above problem, a communication control apparatus according to the present invention is a communication control apparatus for implementing transmission and reception of data to and from a plurality of firewall devices connectable to a mobile station, the communication control apparatus comprising: storing means for storing firewall configuration information suitable for the mobile station, in correspondence with identification information of the mobile station; detecting means for detecting a firewall device connected to the mobile station; and transmitting means for, in conjunction with the detection of the firewall device connected to the mobile station, transmitting the firewall configuration information corresponding to the identification information of the mobile station, to the firewall device.

A data communication method according to the present invention is a data communication method in which a communication control apparatus comprising storing means for storing firewall configuration information suitable for a mobile station, in correspondence with identification information of the mobile station, implements transmission and reception of data to and from a plurality of firewall devices connectible to the mobile station, the data communication method comprising: a detecting step wherein detecting means of the communication control apparatus detects a firewall device connected to the mobile station; and a transmitting step wherein, in conjunction with the detection of the firewall device connected to the mobile station, transmitting means of the communication control apparatus transmits the firewall configuration information corresponding to the identification information of the mobile station, to the firewall device.

According to these aspects of the invention, in conjunction with the detection of the firewall device connected to the mobile station, the firewall configuration information corresponding to the identification information of the mobile station is transmitted to the firewall device as a point newly connected to the mobile station. This permits the firewall configuration information suitable for the mobile station to be transmitted and set in the firewall device connected to the mobile station.

Therefore, not only in the case where the mobile station is initially connected to a firewall device, but also in the case where the mobile station moves to change its connected firewall device, the firewall configuration information is transmitted and set in the firewall device after the change of the connected point. Namely, the firewall configuration information tracks the movement of the mobile station. Since the firewall configuration information contains the filtering condition for a packet addressed to the mobile station, the propriety of passage (whether to forward or to discard) is determined for the above packet arriving at the firewall device, according to the filtering condition. As a consequence, it becomes feasible to apply the appropriate firewall function to the mobile station as well.

A firewall apparatus according to the present invention is a firewall apparatus for implementing relaying in transmission and reception of data between the communication control apparatus as set forth, and a plurality of mobile stations, the firewall apparatus comprising: retaining means for retaining a filtering condition included in the firewall configuration information, in correspondence with identification information of each mobile station; distinguishing means for distinguishing a mobile station being a destination of a packet transmitted from the communication control apparatus; and determining means for determining the propriety of passage of the packet in accordance with the filtering condition corresponding to the mobile station distinguished by the distinguishing means.

A data communication method according to the present invention is a data communication method in which a firewall apparatus implements relaying in transmission and reception of data between the communication control apparatus as set forth, and a plurality of mobile stations, the data communication method comprising: a retaining step wherein retaining means of the firewall apparatus retains a filtering condition included in the firewall configuration information, in correspondence with identification information of each mobile station; a distinguishing step wherein distinguishing means of the firewall apparatus distinguishes a mobile station being a destination of a packet transmitted from the communication control apparatus; and a determining step wherein determining means of the firewall apparatus determines the propriety of passage of the packet in accordance with the filtering condition corresponding to the mobile station distinguished in the distinguishing step.

According to these aspects of the invention, after the filtering condition included in the firewall configuration information is retained in correspondence with the identification information of each mobile station, the distinguishing means distinguishes the mobile station being the destination of the packet transmitted from the communication control apparatus to the firewall apparatus and the determining means determines the propriety of passage of the packet in accordance with the filtering condition corresponding to the mobile station. This permits the filtering condition, which is used in determining the propriety of passage of the packet arriving at the firewall apparatus, to be properly changed for each mobile station. Therefore, the passage propriety determining process is prevented from being carried out without necessity, even for a mobile station that cannot be the destination of the packet. As a result, it becomes feasible to suppress increase in the transmission delay time of packet to each mobile station, even with increase in the number of mobile stations using the firewall apparatus.

A communication control system according to the present invention is a communication control system comprising the communication control apparatus as set forth; and the firewall apparatus as set forth, wherein the mobile station receives a packet to be received, via the firewall apparatus.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 6 is a flowchart for explaining the firewall construction processing in the second embodiment.

FIG. 7 is a flowchart for explaining the firewall construction processing in the third embodiment.

FIG. 8 is a flowchart for explaining the firewall construction processing in the fourth embodiment.

FIG. 9 is a flowchart for explaining the firewall construction processing in the fifth embodiment.

DESCRIPTION OF THE PREFERRED EMBODIMENTS

First Embodiment

The first embodiment of the present invention will be described below in detail with reference to the drawings.

Figure 1:
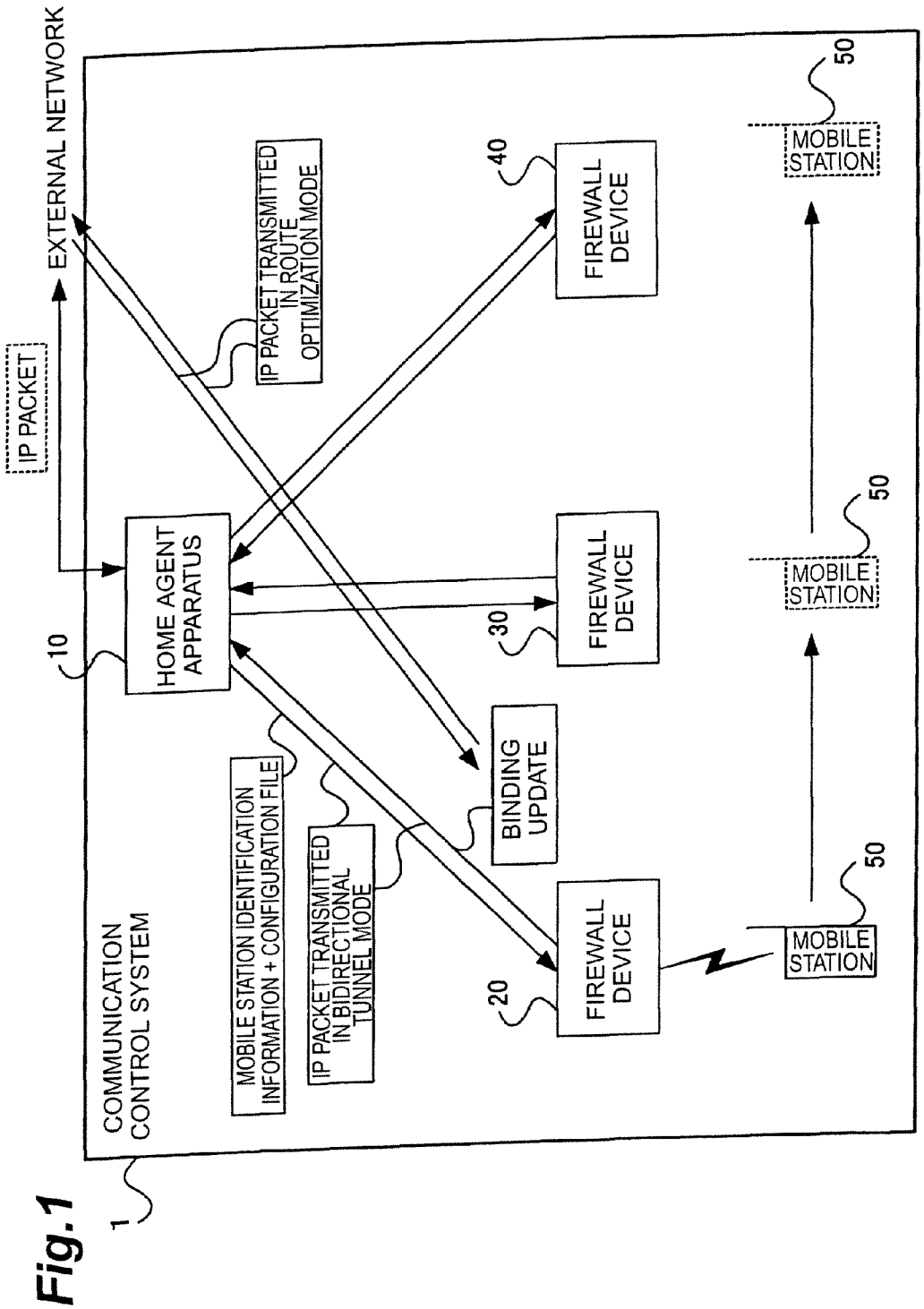
FIG. 1 is an illustration showing the overall configuration of the communication control system.

FIG. 1 is an illustration showing the overall configuration of communication control system 1 according to the present invention. As shown in FIG. 1, communication control system 1 is comprised of home agent apparatus 10 (corresponding to the communication control apparatus), three firewall devices 20, 30, 40 (corresponding to the plurality of firewall devices), and mobile station 50.

The home agent apparatus 10 and mobile station 50 are connected so as to be able to transmit and receive various data to and from each other, via at least arbitrary one of the three firewall devices 20-40. An IP packet transmitted through the external network such as the Internet is once received by the home agent apparatus 10, and thereafter it is relayed by the firewall device 20 located nearest to the current location of the mobile station 50, whereby it can reach the mobile station 50 being the destination of the IP packet.

Figure 2:
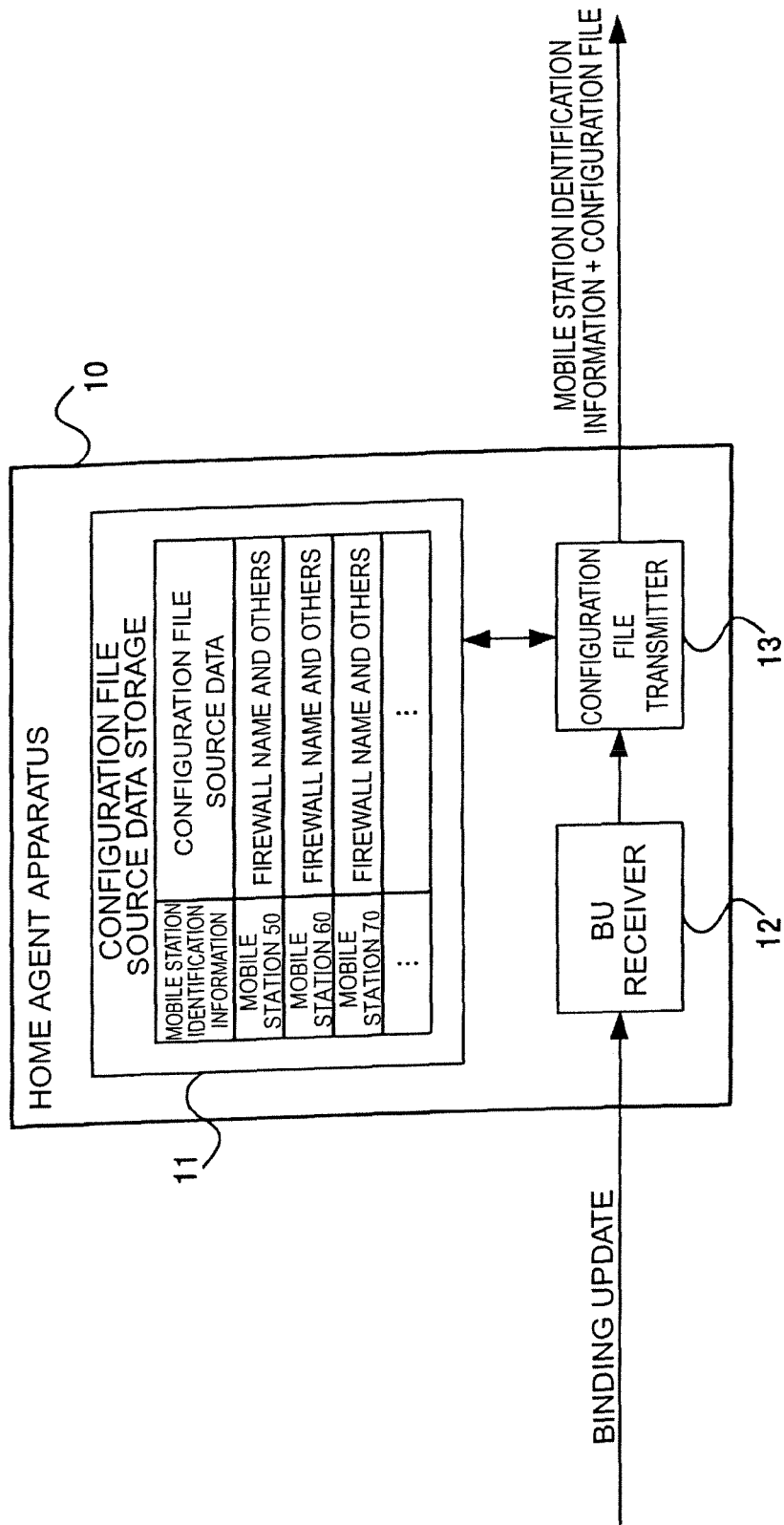
FIG. 2 is a block diagram showing the functional configuration of the home agent apparatus.

FIG. 2 is an illustration showing the functional configuration of home agent apparatus 10 according to the present invention. As shown in FIG. 2, the home agent apparatus 10 is comprised of configuration file source data storage 11 (corresponding to the storing means), BU receiver 12 (corresponding to the detecting means), and configuration file transmitter 13 (corresponding to the transmitting means). Each of the components is connected through a bus so as to be able to receive and send signals according to the functions of the respective components.

Each of the components of the home agent apparatus 10 will be described below in detail.

The configuration file source data storage 11 stores after-described configuration file source data (corresponding to the firewall configuration information) in correspondence with mobile station identification information. The mobile station identification information is, for example, a home address or a MAC address of each mobile station.

The information described in the configuration file source data is, for example, information below.

① Firewall name
② Information necessary for generation of "routing criterion for an IP packet from the external network"
③ Information necessary for generation of "routing criterion for an IP packet from the mobile station"
④ Information necessary for generation of "access control list"

Namely, the information of ① is information capable of uniquely identifying the configuration contents of the firewall and is used when the home agent apparatus 10 deletes the configuration file source data that already has been transmitted or that has been retained over a predetermined time from generation thereof.

The information of ② is information for allowing the firewall apparatus to distinguish the mobile station being the destination of an IP packet transmitted from the external network via the home agent apparatus 10. The information of ② is described according to necessity. This information is, for example, an IP address of mobile station 50, but may be one designating a range of destination IP addresses, without always having to be limited to only one IP address.

The information of ③ is information for allowing the firewall apparatus to distinguish the source of an IP packet transmitted from the mobile station. This information is, for example, information for designating either the routing criterion based on the source MAC address or the routing criterion based on the source IP address, or the MAC address in use of the routing criterion based on the MAC address.

The information of ④ is information necessary for generation of a well-known, customary access control list containing a description of a filtering condition which is used when the firewall apparatus determines the propriety of passage of an IP packet. For example, it is information for designating a list as a source of the access control list, and which part on the list should be replaced with a c/o address. However, the access control list contains the description of the filtering condition used in determining the propriety of passage of an IP packet addressed to the mobile station distinguished based on the information of ② and ③, but contains no description about the filtering conditions for the other mobile stations. This reduces the volume of search data in the determination on the propriety of passage, so as to speed up the packet filtering process. The access control list is described in row units so as to permit sequential searches from the top row, and contains the description of the following items in order from the head of each row: "deny" or "permit" indicating the propriety of passage of an IP packet, a higher-layer protocol of the IP packet, a source address and a source port number of the IP packet, a destination address and a destination port number of the IP packet, and so on.

The BU receiver 12 receives a Binding Update (BU) being a packet for notifying that the mobile station 50 has moved, from the firewall device 20 after the movement. The BU receiver 12 receives this Binding Update, to detect a connection of the mobile station 50 to the firewall device (including a change of the connected device), and notifies the configuration file transmitter 13 of it.

The configuration file transmitter 13, thus notified of the connection of mobile station 50 by the BU receiver 12, refers to the above Binding Update to identify the mobile station connected to the firewall device. The configuration file transmitter 13 acquires the identification information and corresponding configuration file source data of the identified mobile station from the configuration file source data storage 11 and generates a configuration file based on the configuration file source data. The configuration file transmitter 13 transmits the identification information and configuration file of the mobile station, together with a Binding Ack (BA: Binding Acknowledgement), to the firewall device being the device newly connected to the mobile station 50. The Binding Ack is an acknowledgement signal as a reply to the Binding Update.

Figure 3:
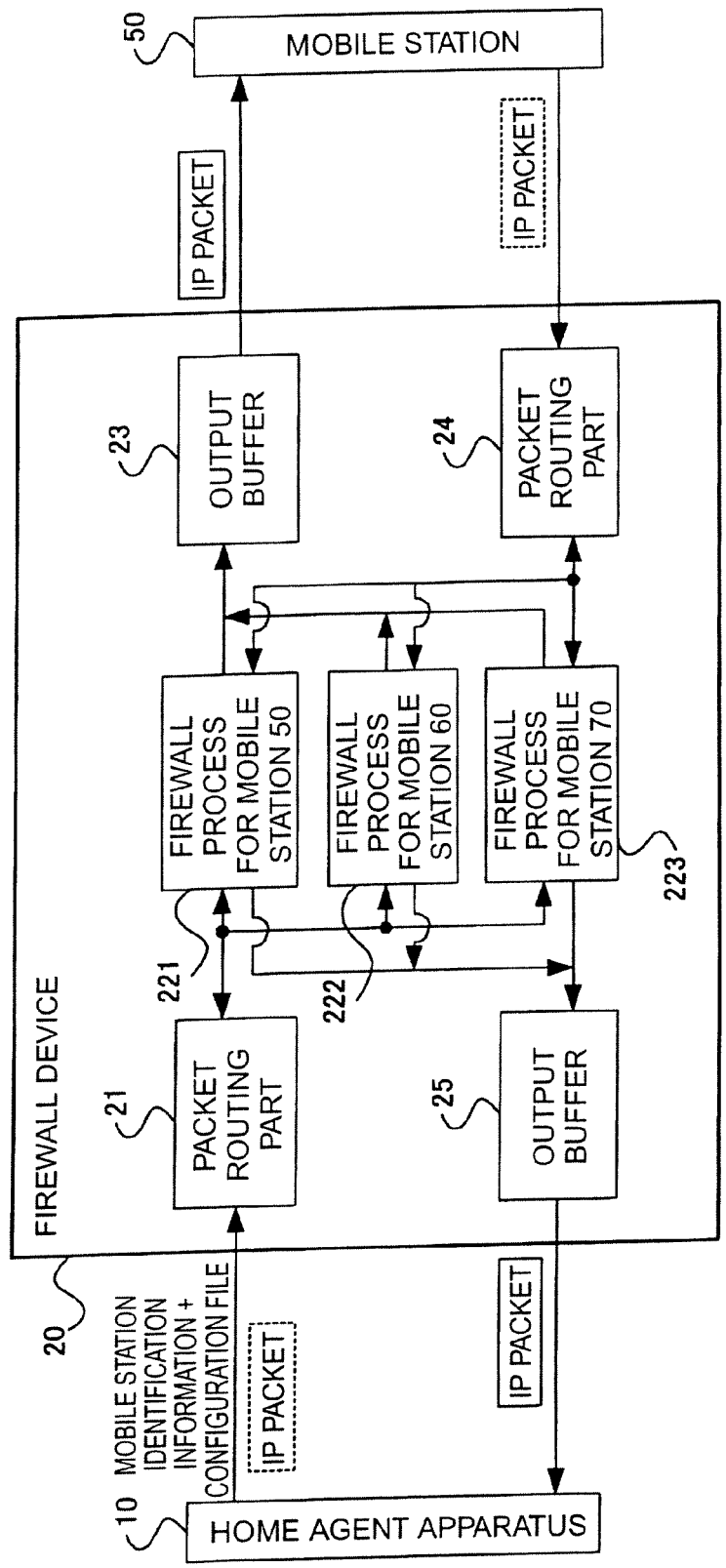
FIG. 3 is a block diagram showing the functional configuration of the firewall apparatus.

FIG. 3 is an illustration showing the functional configuration of firewall device 20 according to the present invention. The firewall device 20 may be a router itself, including an access router, or may be a terminal dedicated to a firewall and constructed separately from the router. As shown in FIG. 3, the firewall device 20 is comprised of packet routing parts 21, 24 (corresponding to the distinguishing means), firewall processes 221, 222, 223 (corresponding to the retaining means and determining means) and output buffers 23, 25. Each of the components is connected through a bus so as to be able to send and receive signals according to the functions of the respective components.

When receiving the mobile station identification information and configuration file from the home agent apparatus 10, the packet routing part 21 identifies a firewall process in which the configuration file should be set, on the basis of the mobile station identification information. When there is no pertinent firewall process, it generates a firewall process. The mobile station identification information and configuration file are retained in the firewall process thus identified or generated. The firewall name in the configuration file, and the routing criterion for the IP packet from the external network are set in the packet routing part 21. The firewall name in the configuration file, and the routing criterion for the IP packet from the mobile station are set in the packet routing part 24.

Thereafter, the packet routing part 21, receiving an IP packet from the external network, outputs the IP packet to the firewall corresponding to the destination mobile station in accordance with the routing criterion thus set. Likewise, the packet routing part 24, receiving an IP packet from a mobile station, outputs the IP packet to the firewall process corresponding to the source mobile station thereof in accordance with the routing criterion thus set.

When an IP packet is transmitted in the direction from the external network to mobile station 50 (downward), the firewall process 221 acquires the destination IP address and source IP address for filtering, according to the steps of procedure indicated below by 1 to 3, from the IP packet acquired from the packet routing part 21, prior to the determination on the propriety of passage.

1. Where the IP packet is transmitted in the bidirectional tunnel mode, i.e., in the case where the source address of the outside IP packet is the home agent address, where the destination address is a c/o address, and where the IP packet contains an IP packet, the firewall process 221 acquires the internal IP packet and applies the steps of 2 and 3 below to the IP packet thus acquired. On the other hand, where the IP packet is transmitted in the other mode than the bidirectional tunnel mode, the firewall process 221 applies the steps of 2 and 3 below to the original IP packet acquired from the packet routing part 21.

2. Where the IP packet is transmitted to the mobile station 50 in the route optimization mode, i.e., in the case where the destination address of the IP packet is a c/o address, where the routing header exists, and where the second destination set in the routing header is a home address, the firewall process 221 uses the home address as a destination IP address for filtering. On the other hand, where the IP packet is transmitted to the mobile station 50 in the other mode than the route optimization mode, the firewall process 221 uses the destination address of the IP packet as a destination IP address for filtering as it is.

3. Where the IP packet is transmitted from a mobile IP terminal in the route optimization mode, i.e., in the case where the source address of the IP packet is a c/o address and where the home address option is set, the firewall process 221 uses the address set in the home address option as a source IP address for filtering. On the other hand, where the IP packet is transmitted from the mobile IP terminal in the other mode than the route optimization mode, the firewall process 221 uses the source address of the IP packet as a source IP address for filtering as it is.

When an IP packet is transmitted in the direction from mobile station 50 to the external network (upward), the firewall process 221 acquires the destination IP address and source IP address for filtering, according to the steps of procedure indicated below by 1 to 3, from the IP packet acquired from the packet routing part 24, prior to the determination on the propriety of passage.

1. Where the IP packet is transmitted in the bidirectional tunnel mode, i.e., in the case where the source address of the outside IP packet is a c/o address, where the destination address is the home agent address, and where the IP packet contains an IP packet, the firewall process 221 acquires the internal IP packet and applies the steps of 2 and 3 below to the IP packet thus acquired. On the other hand, where the IP packet is transmitted in the other mode than the bidirectional tunnel mode, the firewall process 221 applies the steps of 2 and 3 below to the original IP packet acquired from the packet routing part 24.

2. Where the IP packet is transmitted to a mobile IP terminal in the route optimization mode, i.e., in the case where the routing header exists in the IP packet, the firewall process 221 uses the second destination set in the routing header, as a destination IP address for filtering. On the other hand, where the IP packet is transmitted to the mobile IP terminal in the other mode than the route optimization mode, the firewall process 221 uses the destination address of the IP packet as a destination IP address for filtering as it is.

3. Where the IP packet is transmitted from mobile station 50 in the route optimization mode, i.e., in the case where the source address of the IP packet is a c/o address and where the home address option is set, the firewall process 221 uses the address set in the home address option, as a source IP address for filtering. On the other hand, where the IP packet is transmitted from mobile station 50 in the other mode than the route optimization mode, the firewall process 221 uses the source address of the IP packet as a source IP address for filtering as it is.

Furthermore, the firewall process 221 uses the destination IP address and source IP address for filtering acquired in the above procedure, to determine the propriety of passage of the IP packet routed by the packet routing part 21, according to the filtering condition described in the access control list in the configuration file. An IP packet permitted to pass is outputted to the output buffer 23, while an IP packet denied is discarded. This permits the firewall process 221 to implement filtering of any IP packet the destination or source of which is the mobile station 50.

The firewall process 222 has the same functional configuration as the firewall process 221 described above. Namely, the firewall process 222 retains the identification information and configuration file of mobile station 60 (not shown) being another mobile station different from the mobile station 50, and implements filtering of an IP packet with the destination or source address being the mobile station 60. The firewall process 223 is also similarly configured to retain the identification information and configuration file of mobile station 70 (not shown) being still another mobile station and implement filtering of an IP packet with the destination or source being the mobile station 70.

The output buffer 23 transmits (or forwards) an IP packet fed from one of the firewall processes 221-223, through a radio channel to a mobile station being the destination of the IP packet.

The packet routing part 24 has the same functional configuration as the packet routing part 21 described above, but is different in the transmitting direction of the IP packet from the packet routing part 21. Namely, the packet routing part 21 receives the IP packet from the external network such as the Internet established on the home agent apparatus 10 side, whereas the packet routing part 24 receives the IP packet transmitted from the mobile station 50 side.

The output buffer 25 transmits (or forwards) an IP packet fed from one of the firewall processes 221-223, to a destination node of the IP packet.

The firewall devices 30, 40 are different in the installation location from the firewall device 20, but are constructed in much the same manner as to the configuration as the aforementioned firewall device 20 is. Therefore, the description of them is omitted herein.

The mobile station 50 is a mobile node pursuant to Mobile IPv6. In conjunction with a power-on operation or a reconnection after a long-term disconnection, the mobile station 50 is wirelessly connected to a firewall device with the highest reception level out of the firewall devices 20-40. Although it is assumed in the present embodiment, particularly, that the mobile station 50 is newly connected (or initially connected) to the firewall device 20 in the communication control system 1, it is a matter of course that the mobile station can change its connected device (or be handed over) to another firewall device with migration thereof.

After the mobile station 50 is connected to the firewall device, it transmits the aforementioned Binding Update via the connected firewall device to the home agent apparatus 10. The mobile station 50 receives the aforementioned Binding Ack transmitted from home agent apparatus 10.

The operation of communication control system 1 will be described below with reference to FIGS. 4 and 5. In addition thereto, each of steps constituting the data communication method according to the present invention will be described.

Figure 4:
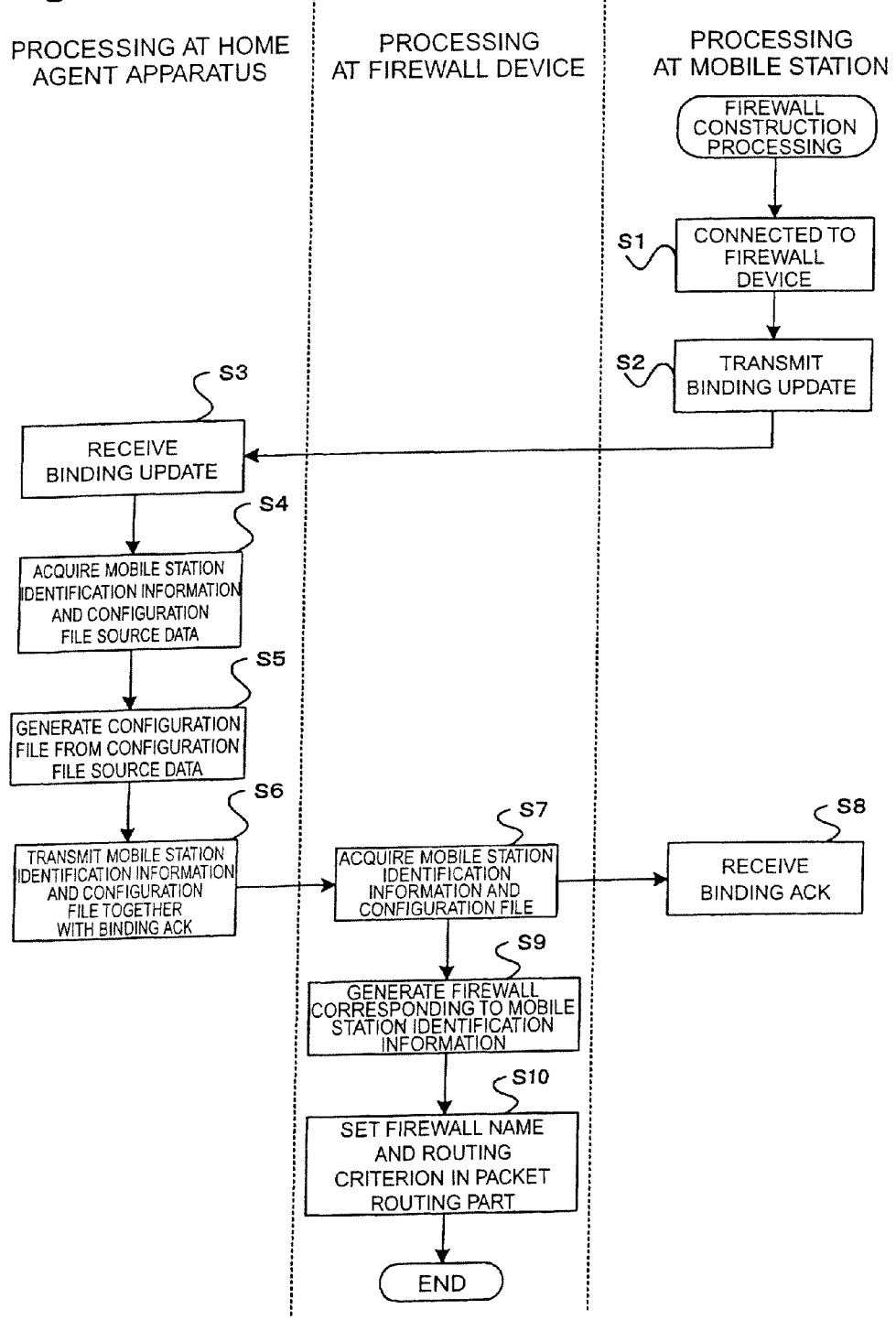
FIG. 4 is a flowchart for explaining the firewall construction processing in the first embodiment.
Figure 5:
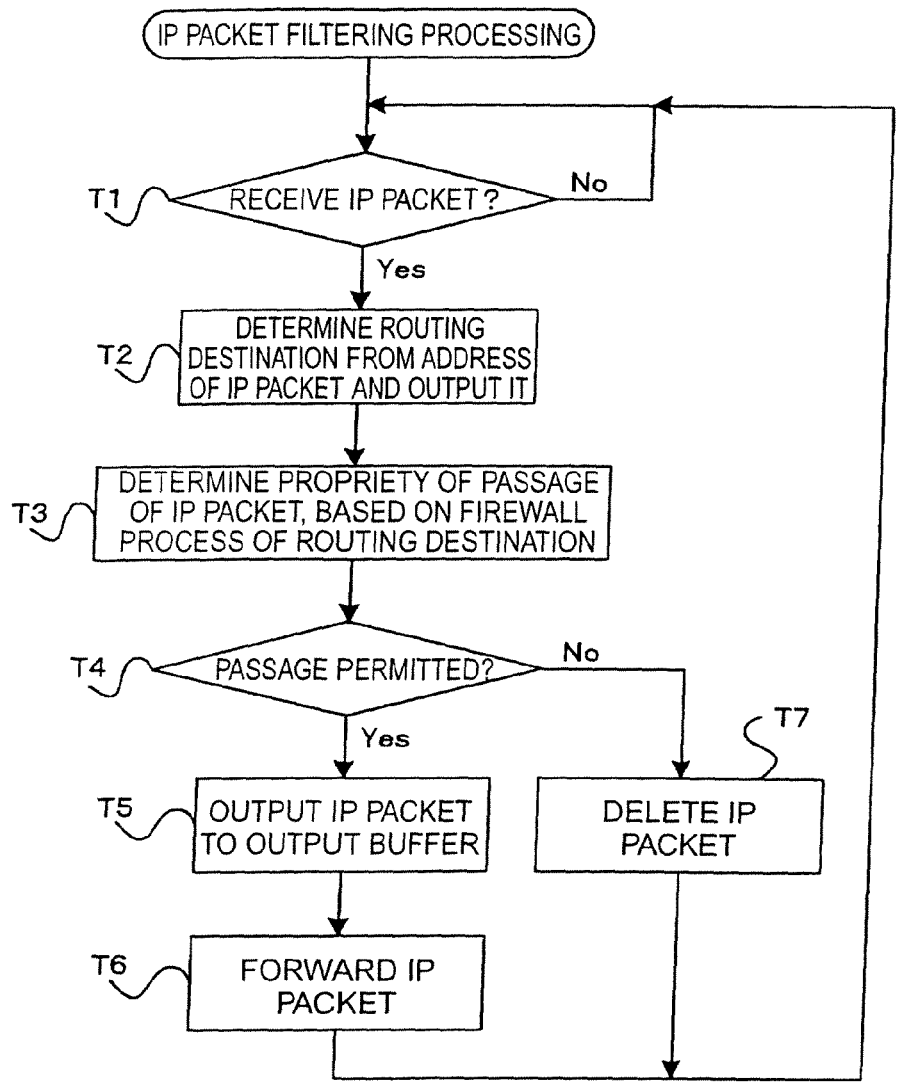
FIG. 5 is a flowchart for explaining the IP packet filtering processing.

FIG. 4 is a flowchart for explaining the firewall construction processing executed and controlled by communication control system 1.

First, at S1, in conjunction with a power-on operation or a reconnection after a long-term disconnection, the mobile station 50 is wirelessly connected to firewall device 20 with the highest reception level (normally located nearest) out of the firewall devices 20 to 40.

At S2, the mobile station 50 transmits the Binding Update to home agent apparatus 10 in order to notify that the wireless connection with the firewall device 20 is completed, in accordance with the conventional connection procedure of Mobile IPv6. This Binding Update contains at least the identification information of mobile station 50 being the source.

At S3, the home agent apparatus 10 makes the BU receiver 12 receive the Binding Update transmitted from the mobile station 50.

At S4, the home agent apparatus 10 makes the configuration file transmitter 13 acquire the identification information and the corresponding configuration file source data of the mobile station 50 from the configuration file source data storage 11, based on the identification information of the source mobile station in the above Binding Update.

At S5, the home agent apparatus 10 makes the configuration file transmitter 13 generate the configuration file according to the steps of procedure indicated below by I-V, on the basis of the configuration file source data acquired at S4.

I. To copy the firewall name from the configuration file source data.

II. To set a c/o address as a "routing criterion for the IP packet from the external network."

III. To set a home address and a c/o address as a "routing criterion for the IP packet from the mobile station," where the source IP address is designated to be used as a routing criterion; or to copy the MAC address in the configuration file source data as a "routing criterion for the IP packet from the mobile station," where the source MAC address is designated to be used as a routing criterion.

IV. To replace a portion designated for rewriting on a list as a source of the access control list, with a c/o address, and set the resultant as an "access control list."

V. To set the IP address of the home agent as a "home agent address."

At S6, the home agent apparatus 10 makes the configuration file transmitter 13 attach the identification information of the mobile station 50 acquired at S4 and the configuration file generated at S5, to the Binding Ack and transmit it to the mobile station 50.

The present embodiment was described above on the assumption that the configuration file was generated and transmitted by the home agent apparatus 10. However, it is also possible to adopt a configuration wherein the home agent apparatus 10 transmits the configuration file source data to the firewall apparatus and the firewall apparatus generates the configuration file on the basis of the configuration file source data.

Since the mobile station 50 is connected to the firewall device 20, the Binding Ack directed to the mobile station 50 naturally passes the firewall device 20. At S7, the firewall device 20 acquires the identification information and configuration file of the mobile station 50 which are attached to the Binding Ack in process of transmission.

At S8, the mobile station 50 receives the Binding Ack and this completes the location registration of the mobile station 50 with the home agent apparatus 10. At this time, the mobile station 50 may receive the foregoing configuration file along with the Binding Ack.

The mobile station identification information and configuration file were assumed to be transmitted on the Binding Ack, but they may be transmitted separately from the Binding Ack. Namely, the home agent apparatus 10 determines the prefix of the firewall device 20 connected to the mobile station 50, based on the c/o address of the Binding Update and multicasts the configuration file to all the firewall devices on the network indicated by the prefix. Thereafter, the home agent apparatus 10 transmits the Binding Ack to the mobile station 50.

At S9, the firewall device 20 generates the firewall process 221 for the mobile station 50, using the identification information and configuration file of the mobile station 50 acquired at S7. The generation of the firewall at S9 is to customize the process of executing the access control list in the configuration file, so as to adapt to a specific mobile station. On the occasion of the generation of the firewall, the above process is initialized (to set internal variables) if necessary, and if an operation condition before movement exists in the configuration file, it is set into the internal variables of the above process.

At S10, the firewall device 20 acquires the firewall name and routing criteria from the configuration file acquired at S7, and sets them in the packet routing parts 21 and 24.

The above described the process of constructing the firewall applied to the mobile station 50, but the firewalls applied to the mobile stations 60, 70 are also constructed through similar steps.

Subsequently, the IP packet filtering processing executed and controlled by the firewall device 20 after the construction of the firewall will be described with reference to FIG. 5.

The description below will be predicated on a case where an IP packet is transmitted in the direction from the home agent 10 to the mobile station 50 (downward), but it is also noted that similar processing can be executed where the IP packet is transmitted in the opposite direction thereto (upward).

At T1, the packet routing part 21 monitors whether or not an IP packet is received.

At T2, the packet routing part 21 identifies the destination IP address from the header information of the IP packet and outputs the IP packet to a routed address of the firewall corresponding to the mobile station having the destination address. For example, where the destination IP address of the IP packet is the IP address of the mobile station 50, the IP packet is routed to the firewall process 221.

At this time, there is a conceivable situation that the firewall as a routed address of the received IP packet is not generated yet. In this case, a preset process (hereinafter referred to as a "default process") is executed. The default process is, for example, such that the firewall device 20 checks the description content of the IP packet and if the description content is the Binding Update to the home agent apparatus 10, the firewall device transmits the packet to the home agent apparatus 10. If the description content is not the Binding Update, the IP packet is discarded at that point.

At T3, the firewall process 221 determines the propriety of passage of the IP packet, based on the above process generated at S9 in FIG. 4. The firewall process 221 may be configured to execute the processes including setting of passage priority order, inspection of authentication information, change of the description content, etc., is addition to the passage propriety determining process of the IP packet.

When the determination at T3 results in permitting passage (T4; Yes), the firewall process 221 makes the IP packet outputted to and retained in the output buffer 23 (T5). Then at T6 the IP packet retained in the output buffer 23 is transmitted via a radio channel connecting the firewall device 20 and the mobile station 50, to the mobile station 50.

On the other hand, when the determination at T3 results in denying passage (T4; No), the firewall process 221 deletes the IP packet (T7). At this time, the home agent apparatus 10 being the source of the IP packet may be notified of the deletion of the IP packet.

After completion of the process of T6 or T7, the firewall device 20 returns to T1 to await reception of a further IP packet, and again executes the processes at and after T1.

The above described the process in which the communication control system 1 performed the filtering for the IP packet addressed to the mobile station 50, and it is noted that the filtering process for the IP packets addressed to the mobile stations 60, 70 can also be executed through similar steps. This makes it feasible to perform the fast and appropriate passage propriety determination about IP packets addressed to all the mobile stations for which the dedicated firewalls are generated.

As described above, the communication control system 1 according to the present invention is configured to place the firewall at the location of the terminal to which the mobile station can be directly connected. When the home agent apparatus 10 receives the Binding Update transmitted from an arbitrary mobile station, it transmits the configuration file of the firewall suitable for the mobile station to the firewall device. The firewall device generates the firewall suitable for the mobile station, using the configuration file. This results in constructing the firewall for the mobile station in any firewall device connected to the mobile station, whereby it becomes feasible to apply the firewall function to any moving terminal.

It is expected herein that the application of the firewall function to mobile equipment astronomically increases the volume of described data in the access control list designating the filtering condition, with increase in the number of users utilizing the mobile equipment. On the other hand, on the occasion of determining the propriety of passage of each packet, the firewall apparatus performs collation between the header information and the condition in order from the top row in the access control list. For this reason, there is concern that the increase of the volume of described data results in increasing the processing time of the passage propriety determination and increasing the transmission delay time of the packet.

An effective means for clearing up such concern is that the firewall apparatus uses different filtering conditions for respective mobile stations. A possible technique of changing the filtering conditions for the respective mobile stations is to change physical interfaces for the respective mobile stations. It is, however, extremely difficult to apply this technique to the case where the same physical interface is shared among a number of mobile stations, like layer 2 connection typified by wireless LANs.

In order to change the filtering conditions for the respective mobile stations, the firewall apparatus, receiving a packet, distinguishes the mobile station as a destination of the packet and properly changes the firewall applied to the packet, according to the result of the distinguishing operation. This prevents unnecessary passage propriety determinations from being made on mobile stations to which the packet cannot be transmitted. Accordingly, increase is suppressed in the transmission delay time of the packet due to the increase of the number of mobile stations. As a result, it becomes feasible to apply the firewall function to the mobile equipment, without decrease in the speed of the forwarding process.

Second Embodiment

The second embodiment of the present invention will be described below in detail with reference to the drawings.

The first embodiment was based on the case where the mobile station 50 was initially connected to the firewall apparatus in the communication control system 1. For this reason, the firewall apparatus operated to receive and use the configuration file generated by the home agent apparatus. In contrast to it, the present embodiment is predicated on the case where the mobile station 50 moves to be changed (handed) over to another firewall device as a connected device, and the new firewall device after movement receives and uses the configuration file retained in the preceding firewall device before movement.

The communication control system in the present embodiment will be described below in detail.

The configuration of the communication control system in the present embodiment is much the same as the configuration of the communication control system detailed in the first embodiment. Therefore, each component will be denoted by the same reference symbol, without description thereof. The present embodiment is based on the assumption that the mobile station 50 changes its connected point from the firewall device 20 to the firewall device 30.

The firewall construction processing executed by the communication control system 1 will be described below with reference to FIG. 6.

When the mobile station 50 changes its connected firewall device (S11), it sends the Binding Update to the home agent apparatus 10 (S12).

Receiving the Binding Update from the mobile station 50 (S13), the home agent apparatus 10 transmits the IP address of the preceding firewall device 20 to the new firewall device 30 (S14). The home agent apparatus 10 was notified of this IP address together with a Binding Update when the mobile station 50 was connected to the firewall device 20, i.e., before the movement.

The firewall device 30 receives the IP address of the firewall device 20 (S15), and in conjunction therewith, it transmits a request for forwarding of the configuration file for mobile station 50, to the received address (S16).

The firewall device 20 receives the forwarding request from the firewall device 30 (S17), and then it transmits the identification information and configuration file of the mobile station 50 having been retained in the firewall process 221, to the firewall device 30 (S18).

The firewall device 30 receives the identification information and configuration file of mobile station 50 from the firewall device 20 (S19), and then generates the firewall for mobile station 50, using the configuration file (S20).

Thereafter, processing similar to S10 shown in FIG. 4 is carried out. Namely, the firewall name and routing criterion are set in the packet routing part 21.

As described above, the mobile station 50 sends the Binding Update to the home agent apparatus 10 in conjunction with a handover. Accordingly, the location of the firewall having the filtering condition suitable for the mobile station is variably controlled with every change of the firewall device connected to the mobile station 50, i.e., with every movement of the mobile station 50. As a result, the firewall tracks the displacement of the mobile station 50, whereby it becomes feasible to apply the firewall function to any moving terminal.

There are a variety of conceivable forms as techniques of constructing the firewall at the location after movement of the mobile station 50, but it is preferable to divert the existing configuration file in the preceding firewall device to the new firewall device, in terms of minimizing the communication load to implement efficient firewall construction. Namely, the new firewall device 30 acquires the IP address of the firewall device already having retained the configuration file of the mobile station 50, from the home agent apparatus 10 and then acquires the configuration file from the mentioned firewall device. This makes it feasible to apply the firewall function to the mobile station 50 after movement, without execution of transmission and reception of the configuration file between the home agent apparatus 10 and the firewall device 30. Since the IP address has the lower volume of data than the configuration file, it is feasible to decrease the communication load on the communication control system 1.

Third Embodiment

The third embodiment as still another mode where the mobile station 50 moves to change its connected firewall device will be described below in detail with reference to the drawings. The configuration of the communication control system in the present embodiment is much the same as the configuration of the communication control system detailed in the first embodiment and thus each component will be denoted by the same reference symbol, without description thereof. The present embodiment is also based on the assumption that the mobile station 50 is handed over from the firewall device 20 to the firewall device 30, as the second embodiment was.

The firewall construction processing executed by the communication control system 1 will be described below with reference to FIG. 7.

The firewall construction processing executed by the communication control system 1 in the present embodiment includes a plurality of steps common to the firewall construction processing detailed in the second embodiment (cf. FIG. 6). Specifically, the steps of S21-S23, S29, S30, and subsequent processing in FIG. 7 are equivalent to those of S11-S13, S19, S20, and subsequent processing, respectively, shown in FIG. 6.

S24-S28 (processes in heavy-line blocks in FIG. 7), which are the specific steps in the present embodiment, will be described below. Namely, in conjunction with the reception of the Binding Update from the mobile station 50, the home agent apparatus 10 transmits a request for forwarding of the configuration file for mobile station 50, to the preceding firewall device 20 (S24).

The firewall device 20 receives the forwarding request from the home agent apparatus 10 (S25), and then transmits the identification information and configuration file of mobile station 50 having been retained in the firewall process 221, once to the home agent apparatus 10 (S26).

The home agent apparatus 10 receives the identification information and configuration file of mobile station 50 from the firewall device 20 (S27), and then transmits (or forwards) these information to the new firewall device 30 (S28). Thereafter, processing similar to S19 shown in FIG. 6 is carried out. Namely, the firewall name and routing criteria are set in the packet routing parts 21 and 24.

By adopting this configuration, the communication control system 1 is able to variably control the location of the firewall and make the firewall track the movement of the mobile station 50 from the old device to the new device.

Fourth Embodiment

The fourth embodiment as still another mode where the mobile station 50 moves to change its connected firewall device will be described below in detail with reference to the drawings. The configuration of the communication control system in the present embodiment is much the same as the configuration of the communication control system detailed in the first embodiment, and thus each component will be denoted by the same reference symbol, without description thereof. The present embodiment is based on the assumption that the mobile station 50 is handed over from the firewall device 20 to the firewall device 30, as the second and third embodiments were.

The firewall construction processing executed by the communication control system 1 will be described below with reference to FIG. 8.

The firewall construction processing executed by the communication control system 1 in the present embodiment includes a plurality of steps common to the firewall construction processing detailed in the third embodiment (cf. FIG. 7). Specifically, the steps of S31-S35, S37, S38, and subsequent processing in FIG. 8 are equivalent to those of S21-S25, S29, S30, and subsequent processing, respectively, shown in FIG. 7.

S36 (a process in a heavy-line block in FIG. 8), which is the specific step in the present embodiment, will be described below. Namely, at S36, in conjunction with reception of the forwarding request of the configuration file from the home agent apparatus 10, the preceding firewall device 20 multicasts the identification information and configuration file of the mobile station 50 having been retained in the firewall process 221.

Here the IP address notified of by the home agent apparatus 10 is used as multicast destination addresses. Namely, the home agent apparatus 10 determines the prefix of firewall device 20 to which the mobile station 50 has been connected, based on the c/o address of the Binding Update received at S33, and selects all the firewall devices on the network indicated by the prefix, as multicast destinations. Thereafter, the home agent apparatus 10 sends the IP addresses of the multicast destinations selected, together with the forwarding request to the firewall device 20. This permits the firewall device 20 to execute the multicast to the other firewall devices 30, 40 in the system.

The identification information and configuration file of the mobile station 50, which were multicast from the firewall device 20, are received by the firewall device 30 on the above network, and are used for generation of the firewall. The identification in formation and configuration file of the mobile station 50, which were multicast to the firewall device 40, can be used for generation of the firewall if the mobile station 50 changes its connected device to the firewall device 40.

By adopting this configuration, the communication control system 1 is also able to variably control the location of the firewall and make the firewall track the movement of the mobile station 50 from the old device to the new device.

Fifth Embodiment

The fifth embodiment as still another mode where the mobile station 50 moves to change its connected firewall device will be described below in detail with reference to the drawings. The configuration of the communication control system in the present embodiment is much the same as the configuration of the communication control system detailed in the first embodiment and thus each component will be denoted by the same reference symbol, without description thereof. The present embodiment is based on the assumption that the mobile station 50 is handed over from the firewall device 20 to the firewall device 30, as the second to fourth embodiments were.

The firewall construction processing executed by the communication control system 1 will be described below with reference to FIG. 9.

The firewall construction processing executed by the communication control system 1 in the present embodiment includes a plurality of steps common to the firewall construction processing detailed in the second embodiment (cf. FIG. 6). Specifically, the steps of S41, S44, S45-S49, and subsequent processing in FIG. 9 are equivalent to those of S11, S13, S16-S20, and subsequent processing, respectively, shown in FIG. 6.

S42 and S43 (processes in heavy-line blocks in FIG. 9), which are the specific steps in the present embodiment, will be described below. Namely, at S42, the mobile station 50 transmits a Binding Update, and the configuration file having been transmitted from the home agent apparatus 10 before the movement (which will be referred to hereinafter as "old configuration file"), to the home agent apparatus 10.

At S43, the new firewall device 30 refers to the old configuration file to acknowledge the IP address of the preceding firewall device 20. This permits the firewall device 30 to identify an address for a request for forwarding of the identification information and configuration file of mobile station 50. Subsequently, the firewall device 30 receives the identification information and configuration file from the firewall device 20 of the forwarding request address, and generates the firewall for the mobile station 50. Therefore, it becomes feasible to variably control the location of the firewall and make the firewall track the movement of the mobile station 50.

As described above, the second to fifth embodiments were configured to forward the information of the configuration file and others from the preceding firewall device to the new firewall device, and the purposes of this operation are as follows.

The first purpose is to take over the state if the firewall device has internal state or global variables. For example, the mobile station operates as follows: upon reception of a connect signal of TCP (Transmission Control Protocol), it stores data about TCP; upon reception of a disconnect signal of TCP, it deletes data; and upon reception of data during periods except for communication periods, it discards the data. Where this operation is applied to the mobile station, it is necessary to hand over the data stored in the mobile station to the new access point after movement.

The second purpose is to minimize forwarding of information. Namely, the information about the access control list, even for a single mobile station, can have high volume of data. The home agent apparatus is often located at the position far from the mobile station (or the firewall device), whereas upon a handover the new firewall device is more likely to be located at the position extremely near to the preceding firewall device. For this reason, the load on the network can be reduced by transmitting the information from the preceding firewall device to the new firewall device, as in the second, fourth, and fifth embodiments.

The present invention is by no means intended to be limited to the above embodiments, but a variety of modifications can be adopted according to necessity without departing from the spirit and scope of the present invention. For example, the main element of generating and transmitting the configuration file of the firewall was the home agent apparatus in the embodiments, but it may be a server apparatus configured separately from the apparatus having the home agent function.

In particular, where the RADIUS (Remote Authentication Dial-In User Service) authentication is carried out for the mobile station, the movement of the mobile station can be detected upon the authentication, and thus the RADIUS server may be configured to generate and transmit the configuration file.

The following will describe a mode in which the RADIUS server is used in place of the home agent apparatus. Since RADIUS is the technology standardized by RFC2865, the detailed description thereof is omitted herein, and the fundamental procedure will be first described briefly. When a remote access apparatus receives a request for remote dial-up access from a user terminal, the remote access apparatus transmits an access request message to the RADIUS server. Normally, this access request message contains a user ID and a password entered at the user terminal. The RADIUS server verifies the user on the basis of the user ID and password and sends a reply message according to the result of the verification (an access permission message or an access rejection message). The remote access apparatus performs execution of the remote access or disconnection of the dial-up access in accordance with this message.

The protocol defining the above procedure was expanded as follows. One expansion is to place various data on a packet as an access permission message. The various data includes, for example, a maximum time available for the remote access of the user terminal, an IP address to be used, a filtering ID, and so on. Another expansion is to apply the RADIUS to the other operations than the remote access. For example, if a wireless LAN base station is used instead of the remote access apparatus, the RADIUS can be used for authentication of users of wireless LAN.

The following will describe the configuration and operation of the communication control system to which the RADIUS is applied, taking the above expansion techniques into account. The communication control system is comprised of at least a mobile station, a firewall apparatus also serving as a radio base station (a base station and firewall), and a RADIUS server. The mobile station, receiving broadcast information, sends a request for connection to the base station, to the base station and firewall being the source of the broadcast information. The base station and firewall, receiving the connection request, sends an access request to the RADIUS server.

The RADIUS server, receiving the access request, performs user verification about the mobile station. When the verification results in obtaining a permission of access, the server generates the configuration file of the firewall for the mobile station. Then the server places the configuration file on the access permission message (packet) and sends it to the base station and firewall. The base station and firewall initializes the firewall process with reference to the configuration file and thereafter permits the mobile station to be connected to the base station.

Namely, the mobile station acquires a permission of communication with a radio base station in a new communication area upon every movement and, with acquisition of the communication permission, the firewall is set in the radio base station. The operation of the RADIUS server about the setting of the firewall is similar to the operation of the home agent apparatus detailed in each of the above embodiments, and thus the description thereof is omitted herein.

Moreover, the mobile station was described as a single device in the embodiments of the invention, but it may be a mobile network in which a plurality of devices are connected through links. In this case, the plurality of devices move simultaneously and similarly, and they are acknowledged as a single terminal by the external network such as the Internet. A device to connect the mobile network to the external network is, for example, a router.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A communication control apparatus for implementing transmission and reception of data to and from a plurality of firewall devices connectible to a mobile station, the communication control apparatus comprising:
    a memory configured to store firewall configuration information suitable for the mobile station, in correspondence with identification information of the mobile station;
    circuitry configured to detect a first firewall device of the plurality of firewall devices connected to the mobile station, wherein
    the communication control apparatus, the mobile station, and each of the plurality of firewall devices are separate and distinct stand-alone devices, and
    the circuitry is configured to receive a binding update packet from the mobile station, the binding update packet indicating that the mobile station has moved and is now connected to a second firewall device; and
    a communication interface configured to transmit, in response to the detection of the second firewall device connected to the mobile station, a request for forwarding the firewall configuration information corresponding to the identification information of the mobile station to the first firewall device to which the mobile station was previously connected, wherein
    the request for forwarding the firewall configuration information includes information requesting that the first firewall device forward the firewall configuration information to the communication control apparatus or information requesting that the first firewall device forward the firewall configuration information to the second firewall device.

2. The communication control apparatus of claim 1, wherein the communication interface is configured to receive the binding update packet transmitted by the mobile station, the binding update identifying the mobile station and the second firewall device.

3. The communication control apparatus of claim 1, wherein
    the circuitry is configured to generate a firewall configuration file from the firewall configuration information stored in the memory, and
    the communication interface is configured to transmit the firewall configuration file to the mobile station.

4. The communication control apparatus of claim 1, wherein the communication interface receives the firewall configuration from the first firewall device in response to the request for forwarding the firewall configuration information, and forwards the firewall configuration received from the first firewall device to the second firewall device.

5. A data communication method in which a communication control apparatus comprising a memory configured to store firewall configuration information suitable for a mobile station, in correspondence with identification information of the mobile station, implements transmission and reception of data to and from a plurality of firewall devices connectible to the mobile station, the data communication method comprising:
    detecting a first firewall device of the plurality of firewall devices connected to the mobile station, wherein
    the communication control apparatus, the mobile station, and each of the plurality of firewall devices are separate and distinct stand-alone devices, and
    the detecting includes receiving a binding update packet from the mobile station, the binding update packet indicating that the mobile station has moved and is now connected to a second firewall device; and
    transmitting, in response to the detection of the second firewall device connected to the mobile station, a request for forwarding the firewall configuration information corresponding to the identification information of the mobile station, to the first firewall device to which the mobile station was previously connected, wherein
    the request for forwarding the firewall configuration information includes information requesting that the first firewall device forward the firewall configuration information to the communication control apparatus or information requesting that the first firewall device forward the firewall configuration information to the second firewall device.

6. A firewall apparatus for implementing relaying in transmission and reception of data between a communication control apparatus, and a plurality of mobile stations, the communication control apparatus storing, for each of the mobile stations, firewall configuration information suitable for the mobile station in correspondence with identification information of the mobile station, the firewall apparatus comprising:
    a communication interface configured to receive, from the communication control apparatus in response to detection of the mobile station switching from being connected to a preceding firewall device to the firewall device, the identification information of the mobile station and the firewall configuration information, both of which were obtained from the preceding firewall device; and circuitry configured to generate a firewall for the mobile station using the received firewall configuration file, wherein the firewall apparatus, the preceding firewall device, the communication control apparatus, and the plurality of mobile stations are separate and distinct stand-alone devices.

\* \* \* \* \*